Jan. 6, 1970        E. G. SIWEK        3,488,227
HERMETIC SEAL CLOSURE FOR AN ELECTROCHEMICAL CELL
Filed June 3, 1968
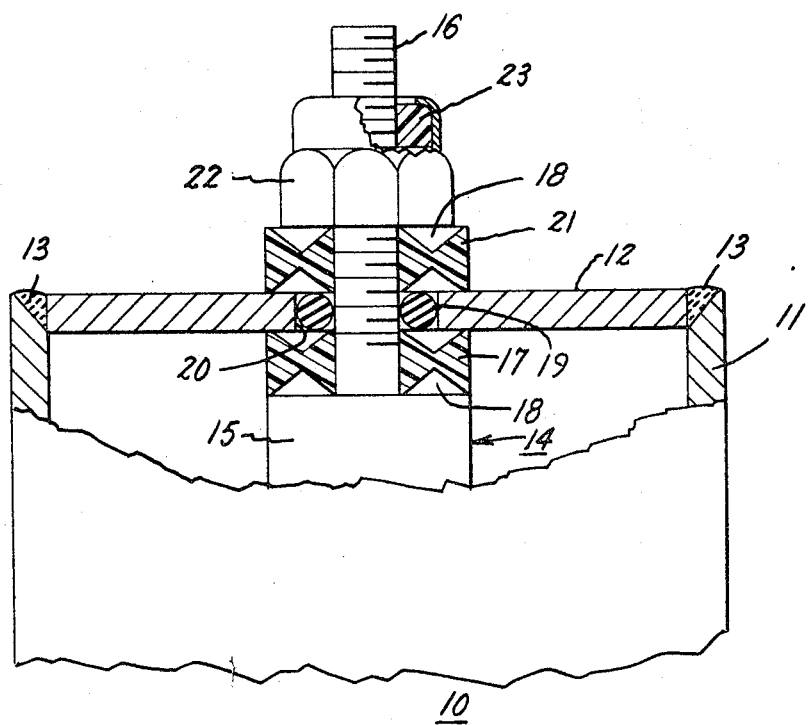
Inventor:
Erwin G. Siwek,
by Paul R. Webb, II
His Attorney.

United States Patent Office 3,488,227
Patented Jan. 6, 1970

3,488,227
HERMETIC SEAL CLOSURE FOR AN
ELECTROCHEMICAL CELL
Erwin G. Siwek, Ballston Spa, N.Y., assignor to General
Electric Company, a corporation of New York
Filed June 3, 1968, Ser. No. 733,951
Int. Cl. H01m 1/02
U.S. Cl. 136—133                                    3 Claims

ABSTRACT OF THE DISCLOSURE

A hermetic seal closure for an electrochemical cell is described which employs a pair of deformable electrically insulating washers, a resilient electrically insultating washer therebetween, and a nut positioned on a terminal lug whereby a seal is provided between the terminal lug and an outer metallic rim member. The hermetic seal closure is effective against both high internal cell pressures and exterior cell pressures.

---

This invention relates to hermetic seal closures for electrochemical cells having an alkaline electrolyte and, more particularly, to such seal closures which are effective against both high internal and external cell pressures.

Batteries, and in particular secondary cells, are used as power sources which depend upon the effectiveness of the seal between one or more terminals extending through the cell casing. Since these cells contain strongly alkaline electrolytes and are subject to environmental changes, these seals should be leakproof, resistant to corrosion by alkaline solutions, and resistant to high internal pressures generated by the cell.

Many batteries utilize non-compressive type seals such as ceramic-to-metal seals and epoxy-to-metal seals. While such seals have low leak rates or outgassing of oxygen, the joint between the ceramic insulating material and the metallic surfaces in a ceramic-to-metal seal is susceptible to electrochemical metal corrosion after a relatively short period of service. The epoxy-to-metal seal is usually "potted" and this approach introduces significant weight problems. Additionally, a bonded elastomeric seal for such electrochemical cells has been described, for example, in U.S. Patent 3,340,099 issued Sept. 5, 1967. The purpose of the seal set forth in this patent is to provide a leakproof cell by bonding an elastomeric sealant to both an electrical terminal and a metallic surface of an electrochemical cell which contains an alkaline electrolyte.

My present invention is directed to a hermetic seal closure for an electrochemical cell wherein the above problems of corrosion, weight and bonding are eliminated by a compact leakproof seal which is easy to assemble. The hermetic seal closure of my invention employs a pair of deformable, electrically insulating washers, each of which has an annular groove on at least its opposed surface, a resilient, electrically insulating washer positioned between the pair of washers, and a nut positioned on a terminal lug thereby providing a leak-tight seal between the terminal lug and an outer metallic rim member.

It is a primary object of my invention to provide a new hermetic seal closure for an electrochemical cell which is non-corrosive, leak-tight, and resistant to both high internal and external cell pressures.

It is a further object of my invention to provide a hermetic seal closure for an electrochemical cell wherein the electrical terminal lug extending through the closure is electrically insulated from the cell casing.

In accordance with one aspect of my invention, a hermetic seal closure for an electrochemical cell has a pair of deformable, electrically insulating washers, a resilient, electrically insulating washer therebetween, and a nut positioned on a terminal lug and forming a leaktight seal with the outer metallic rim member of the cell.

These and various other objects, features and advantages of the invention will be better understood from the following description taken in connection with the accompanying drawing in which:

The single figure is a sectional view of the upper portion of an electrochemical cell including a hermetic seal closure made in accordance with my invention.

In the single figure of the drawing, there is shown generally at 10 the upper portion of an electrochemical cell, such as a nickel-cadmium cell, which includes a metallic can or casing portion 11. A cell lid or outer metallic rim member 12 is joined to can portion 11 to form a cell casing by conventional welding process at weld points 13. The welding process insures the necessary leakproof junction between the outer metallic rim member 12 and can portion 11 of electrochemical cell 10. In this particular embodiment of the invention, can portion 11 is shown as a cylindrical configuration and as such the outer metallic rim member 12 is circular.

The hermetic seal closure of my invention for cell 10 comprises an inner metallic terminal member 14 which has a flange portion 15 and a threaded lug portion 16 which extends outwardly through outer metallic rim member 12. Terminal member 14 can have an electrical tab (not shown) attached thereto at its lower edge which in turn is connected to a positive electrode within the cell. Additionally, a bracket (not shown) can be welded to the lower surface of terminal member 14 into which the upper portion of cathode electrodes of the cell are fitted. A deformable electrically insulating washer 17 is positioned on lug portion 16 and seated againt flange 15. This washer is shown with an annular groove in V-shaped form on each opposite surface thereof. A resilient, electrically insulating washer 19 shown in the form of an O ring is positioned on lug portion 16 and seated against the upper surface of washer 17. Outer metallic rim member 12 is positioned on lug portion 16 and has an aperture 20 of sufficient diameter whereby member 12 is seated against the upper groove surface of washer 17 and surrounds the exterior surface of washer 19. Another deformable, electrically insulating washer 21 is positioned on lug portion 16 and seated against the upper surface of outer metallic member 12 and washer 19. Washer 21 has an annular groove in V-shape form on each opposite surface thereof. A nut 22 is threaded on the end of threaded lug portion 16 and seated against washer 21. Nut 22 has a plurality of threads within its aperture at its inner portion or portion adjacent washer 21. At the outer portion of the nut aperture, there is positioned an apertured insert 23 of a deformable, electrically insulating material.

I discovered unexpectedly that I could provide a new hermetic seal closure for an electrochemical cell having an alkaline electrolyte which closure was compact, inexpensive and easy to assemble. I found further that the hermetic seal closure of my invention protected against high pressure either from the interior of the cell or from the exterior of the cell. Thus, the unique hermetic seal closure is in effect a two sided seal. I found that this seal closure was most effective when both of the deformable electrically insulating washers had an annular groove, preferably in V-shaped form, on opposite surfaces thereof. However, I found also that such a seal closure was sufficiently effective when an annular groove was provided on only the opposed surfaces of the deformable washers which faced the outer metallic rim member. I found further that the seal closure was most effective when the deformable, electrically insulating apertured insert was positioned within at least the outer portion of the nut aperture holding the seal closure in position.

While various materials are available to provide a deformable, electrically insulating washer, a resilient washer, and a nut for my closure assembly, I found that I prefer to employ washers which are made of nylon and to employ a resilient washer made of a neoprene in an O ring configuration. For the nut, I prefer to have a nylon apertured insert in at least the outer portion of the nut aperture.

I found further when my seal closure was assembled as above described and the outer rim member welded to the upper end of the cell can or casing, that tightening of the nut on the threaded portion of the terminal lug deformed the pair of nylon washers with the annular groove on opposite surfaces and forced nylon around the O ring and into the threads on the lug in the area associated with both of these washers thereby providing a leak-tight seal. Additionally, when the nut is tightened in this manner, nylon from the apertured insert is forced into the threads of the terminal lug. In this manner, I found that upon tightening of the nut that I obtained a secure leakproof, and airtight seal closure which provided protection against fluid leakage, high internal pressure of the cell, and from external pressure outside of the cell.

In an illustrative formation of the cell including a hermetic seal closure of my invention and the testing of this closure, the closure was assembled as described above and as shown in the single figure of the drawing. The nut 22 was then tightened whereupon the pair of deformable washers were forced toward one another and forced nylon around the O ring surrounding the lug portion and within the outer metallic member. Additionally, the the deformable material from the washers was forced into the threads on the lug portion. The outer portion of the nut, which was provided with the same deformable electrically insulating material had a portion of this material forced into the threads of the lug. Thus, upon assembly, an airtight and leakproof closure was provided.

An example of a hermetic seal closure for an electrochemical cell made in accordance with my invention is set forth below:

EXAMPLE

In this example, an electrochemical cell having an alkaline electrolyte of 31% potassium hydroxide was assembled as described above. This cell was provided with a plurality of nickel electrodes and cadmium electrodes to form a nickel-cadmium battery. The cell was tested by providing oxygen pressure in excess of 100 pounds per square inch through the interior of the cell. The hermetic seal closure did not leak oxygen or did not spill or leak the electrolyte which was contained in the cell.

While other modifications of the invention and variations thereof which may be employed within the scope of this invention have not been described, the invention is intended to include such as may be embraced within the following claims.

What I claim as new and desire to secure by Letters Patent of the United States is:

1. In a hermetic seal closure for an electrochemical cell having an alkaline electrolyte which comprises an inner metallic terminal member with a flange portion and with a threaded lug portion, an outer metallic rim member with an aperture therein positioned on the lug, an electrically insulating first washer positioned on the lug portion and seated against the opposite surface of the rim member, and a nut threaded on the end of the threaded lug portion and seated against the first washer, the improvements which comprise a deformable, electrically insulating second washer positioned on the lug portion and seated against the flange portion and against the inner surface of the outer metallic rim member, the second washer provided with an annular groove on its surface opposite the flange portion, a resilient, electrically insulating third washer positioned on the lug portion within the aperture of the outer metallic rim member and seated against the grooved surface of the first washer, and the first electrically insulating washer made of deformable material positioned on the lug portion and seated against the opposite surface of the rim member and provided with an annular groove on its surface adjacent the third washer.

2. In a hermetic seal closure as in claim 1, wherein the first washer is provided with an annular groove on its surface adjacent the nut, and the second washer is provided with an annular groove on its surface adjacent the flange portion.

3. In a hermetic seal closure as in claim 2, wherein a deformable, electrically insulating apertured insert is positioned within at least the outer portion of the nut aperture.

References Cited

UNITED STATES PATENTS

| | | | |
|---|---|---|---|
| 2,542,056 | 2/1951 | Ravenscroft | 136—133 XR |
| 3,340,099 | 9/1967 | Sherfey | 136—133 |
| 3,427,205 | 2/1969 | Plitt et al. | 136—133 |

WINSTON A. DOUGLAS, Primary Examiner

A. SKAPARS, Assistant Examiner

U.S. Cl. X.R.

136—168